United States Patent [19]

Lemercier

[11] 4,423,003

[45] Dec. 27, 1983

[54] THERMAL INSULATION DEVICE

[76] Inventor: Guy Lemercier, 67, Avenue de la Bourgade, 13610 Le Puy Ste Reparade, France

[21] Appl. No.: 303,471

[22] Filed: Sep. 18, 1981

[30] Foreign Application Priority Data

Sep. 30, 1980 [FR] France ............................ 80 20917

[51] Int. Cl.³ .......................................... G21C 15/12
[52] U.S. Cl. .................................... 376/290; 376/285
[58] Field of Search ....................... 376/290, 289, 285

[56] References Cited

U.S. PATENT DOCUMENTS

| 4,050,988 | 9/1977 | Lemercier | 376/290 |
| 4,055,464 | 10/1977 | Lemercier | 378/289 |

FOREIGN PATENT DOCUMENTS

| 2538551 | 3/1976 | Fed. Rep. of Germany . |
| 2194283 | 2/1974 | France . |
| 2235329 | 1/1975 | France . |
| 2283518 | 3/1976 | France . |
| 2283522 | 3/1976 | France . |
| 2319074 | 2/1977 | France . |

2018401 10/1979 United Kingdom .

Primary Examiner—Sal Cangialosi
Attorney, Agent, or Firm—Kerkam, Stowell, Kondracki & Clarke

[57] ABSTRACT

Thermal insulation device for insulating the upper area of the annular space separating the main vessel and safety vessel of a fast neutron nuclear reactor, said two vessels having a common vertical axis and are sealed in their upper part by a horizontal slab which is also responsible for the suspension of the two vessels, wherein the said device comprises a lower thermal insulation ring having a generally annular shape defining an inner peripheral edge spaced from the main vessel and fixed to the lower end of an inner thermal insulation baffle whose upper end is fixed to the main vessel, and an outer peripheral edge spaced from the safety vessel and fixed to the lower end of an outer thermal insulation baffle whose upper end is fixed to the safety vessel, each of the thermal insulation baffles being deformable so as to compensate any differential expansion or deformation of the vessels.

9 Claims, 3 Drawing Figures

THERMAL INSULATION DEVICE

BACKGROUND OF THE INVENTION

The present invention relates to a thermal insulation device for insulating the upper area of an annular space provided between the main vessel and the safety vessel of a fast neutron nuclear reactor.

In fast neutron nuclear reactors it is known that the reactor core is located in a vertically axed cylindrical vessel, called the main vessel, which is duplicated by an also cylindrical safety vessel, whose axis coincides with that of the main vessel. These vessels are sealed in their upper part by a normally concrete horizontal slab, which also supports the said vessels. Therefore the upper ends of the main vessel and the safety vessel are embedded in the slab. The main vessel also contains a appropriate volume of a liquid metal such as sodium ensuring the extraction of calories given off by the fission reaction of the fuel in the core. In operation the main vessel temperature is consequently relatively high. The space defined between the main vessel and the safety vessel is filled with an inert gas such as nitrogen, which is raised to a relatively high temperature due to its contact with the outer wall of the main vessel. However, the connecting areas of the vessels to the slab, as well as the parts of the vessels extending these areas below the slab constitute sensitive means for which it is desirable to limit to the greatest possible extent the thermal gradients prejudicial to their mechanical performance and, due to the fact that they are responsible for the suspension of the vessels, the safety of the reactor.

It is therefore considered necessary to insulate the upper area of the annular space provided between the vessels in order to keep the inert gas contained therein at a constant temperature which is significantly below that in the remainder of the annular space. It is also advantageous to provide a thermal insulation device permitting a relatively easy access to the insulated area, particularly for the purpose of inspecting welds within the vessel. The thermal insulation device which thermally insulates the upper area of the annular space between the vessels must also be designed so as to withstand the axial and transverse dimensional variations between the two vessels made inevitable by the temperature changes occurring as a result of the reactor operating conditions. This device must also be able to maintain its insulating capacity, even in the presence of aerosols of liquid cooling metal in the hypothesis of the leak thereof through the main vessel wall. Finally the thermal insulation device must be able to deform in the case of a mechanical or thermal incident in such a way that it does not puncture the vessels.

French patent application No. 74 29649 in the name of the Commissariat à l'Energie Atomique (corresponding to U.S. Pat. No. 4,050,988—Lemercier) already discloses a thermal insulaton device which meets the aforementioned requirements. This device is characterized in that it comprises a lower, generally cylindrical thermal insulation ring mounted beneath the slab and defining with the latter and the wall of the facing vessels the area to be insulated. This ring extends across the annular space in a horizontal plane and is supported by the slab via supporting ties. There is also an upper thermal insulation ring subdivided into two coaxial parts resting on the lower ring and respectively applied to the walls of the two vessels by a system of radially positioned spacing springs which bear against the two parts.

Satisfactory results are generally obtained with such a thermal insulation device. However, it has been found that the coaxial parts constituting the upper thermal insulation ring may seize up or jam after a certain period of use. Jamming of the parts bearing in each case against the vessels under the action of the spacing springs make the latter ineffective, which can lead to a loss of sealing of the device when the temperature variations of the vessels lead to an increase in the width of the annular space between the vessels.

BRIEF SUMMARY OF THE INVENTION

The object of the present invention is a thermal insulation device which fulfils all the aforementioned requirements and which does not have the disadvantage referred to hereinbefore. More specifically the present invention relates to a thermal insulation device ensuring both a correct sealing between the hot inert gas and the cold inert gas on either side of the device and also extension and compression flexibility making it possible to follow without difficulty the expansions or possibly deformations of the vessels.

The present invention therefore relates to a thermal insulation device for insulating the upper area of the annular space separating the main vessel and safety vessel of a fast neutron nuclear reactor, said two vessels having a common vertical axis and are sealed in their upper part by a horizontal slab which is also responsible for the suspension of the two vessels, wherein the said device comprises a lower thermal insulation ring having a generally annular shape defining an inner peripheral edge spaced from the main vessel and fixed to the lower end of an inner thermal insulation baffle whose upper end is fixed to the main vessel, and an outer peripheral edge spaced from the safety vessel and fixed to the lower end of an outer thermal insulation baffle whose upper end is fixed to the safety vessel, each of the thermal insulation baffles being deformable so as to compensate any differential expansion or deformation of the vessels.

In this arrangement it can be seen that the inner and outer thermal insulation baffles make it possible, with the aid of the lower thermal insulation ring, to insulate the hot inert gas located below the thermal insulation device from the cold inert gas positioned above said device, whilst having an adequate flexibility to withstand the expansions and deformations of the vessels without there being any danger of a break in said seal.

According to a preferred embodiment of the invention each of the thermal insulation baffles is constituted by modular cover plates between which is provided a layer of thin metal elements compressed between the cover plates by assembly means such as pins or bolts, and the cover plates are sufficiently thin to permit a deformation of the thermal insulation baffles making it possible to compensate the deformations of the vessels, due more particularly to temperature variations.

The lower thermal insulation ring may also be constituted by upper and lower modular cover plates between which is provided a layer of thin metal elements compressed between said cover plates by assembly means such as pins, the cover plates being sufficiently thin to permit a deformation of the thermal insulation ring, thus making it possible to avoid puncturing of the vessels in the case of excessive deformation thereof, resulting e.g. from a mechanical or thermal incident. In this case the peripheral edges of the thermal insulation ring are fixed to the lower end of the thermal insulation baffles preferably by means of two supporting rings, each of the said rings being constituted by modular elements having in cross-section the shape of a right angle, whereof one side is welded beneath the lower cover plate of the thermal insulation ring and whereof the other side is fixed to the lower end of the corresponding thermal insulation baffle by lower assembly means of said baffle.

In a comparable manner the upper end of each of the baffles can be fixed to the corresponding vessels by the upper assembly means of the baffle, said assembly means then preferably comprising pins welded to the vessel and on to which are screwed nuts.

According to another feature of the invention annular thermal insulation shims can be compressed between each of the thermal insulation baffles and the vessel to which it is fixed in order to maintain the spacing between the baffles and the vessels. For the same reason the central part of each of the baffles can be slightly frustum-shaped in such a way that the distance between each baffle and the vessel to which the baffle is fixed is greater in its lower part than in its upper part.

The lower thermal insulation ring is preferably provided with observation ports which are normally sealed by thermal insulation plugs provided in their upper part with gripping means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
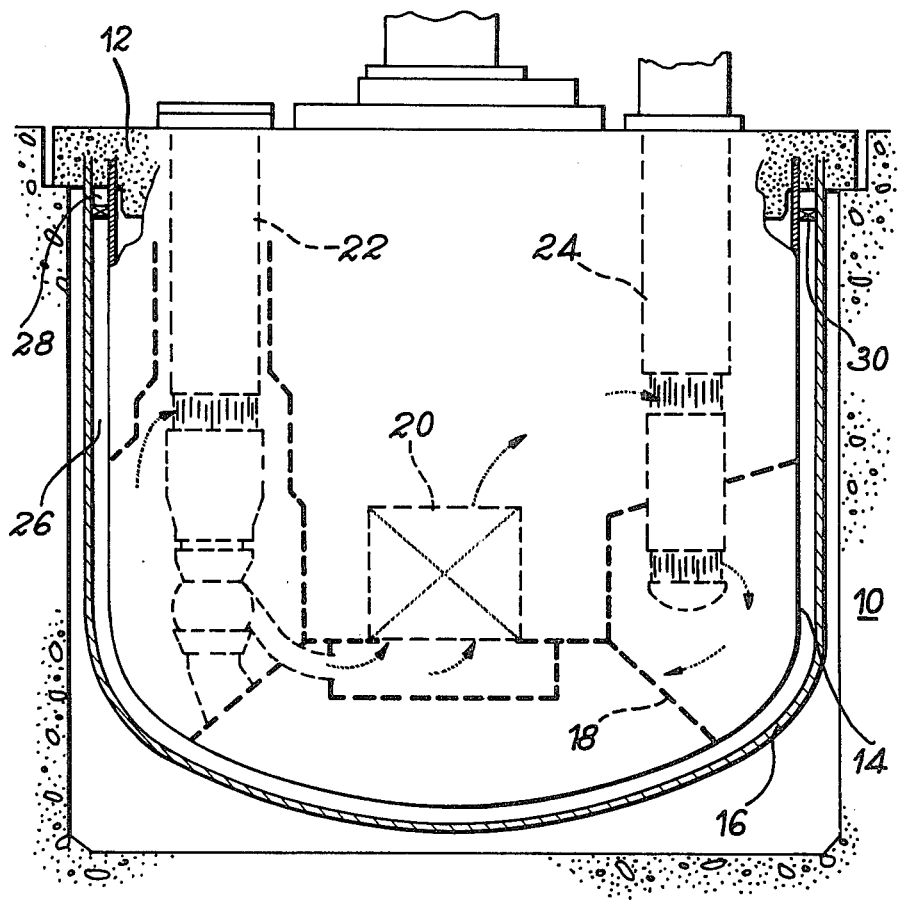
FIG. 1 a diagrammatic sectional view of a fast neutron nuclear reactor showing the location of the thermal insulation device according to the invention.

FIG. 1 very diagrammatically shows the reactor block of an integrated fast neutron nuclear reactor. As is known by those skilled in the art the reactor block comprises a concrete vessel well 10 constituting a lateral, lower biological protection. The vessel well 10 is sealed in its upper part by a concrete slab 12 on which are suspended the main vessel 14 and the safety vessel 16, the latter completely duplicating the envelope of the main vessel. The main vessel 14 and safety vessel 16 have a generally cylindrical configuration and define a common axis coinciding with that of the vessel well 10.

By means of a covering member 18 main vessel 14 supports the reactor core 20 in which circulates from bottom to top a liquid metal such as sodium contained in the main vessel. In integrated fast neutron nuclear reactors all the primary circuit of the reactor is located in the main vessel 14 in such a way that the concrete slab 12 also supports a certain number of pumps 22 and heat exchangers 24. This type of reactor is well known and reference can be made to numerous and existing publications (cf. particularly Bulletin d'Informations Scientifiques et Techniques no. 182 of June 1973) for any additional information concerning the general construction of the reactor and the operation of its various components.

As has been stated hereinbefore the annular space 26 defined between main vessel 14 and safety vessel 16 is filled by an inert gas, normally constituted by nitrogen. In most of the annular space 26 the nitrogen is heated to a relatively high temperature due to its contact with the outer face of main vessel 14 containing liquid sodium. However, it has been shown that it is not desirable for such a heating to take place in the immediate vicinity of the attachment area of the main vessel 14 and safety vessel 16 to the cooled concrete slab 12. Therefore the upper part 28 of annular space 26 is thermally insulated from the remainder of the space by a thermal insulation device 30 constructed in accordance with the teachings of the present invention.

Figure 2:
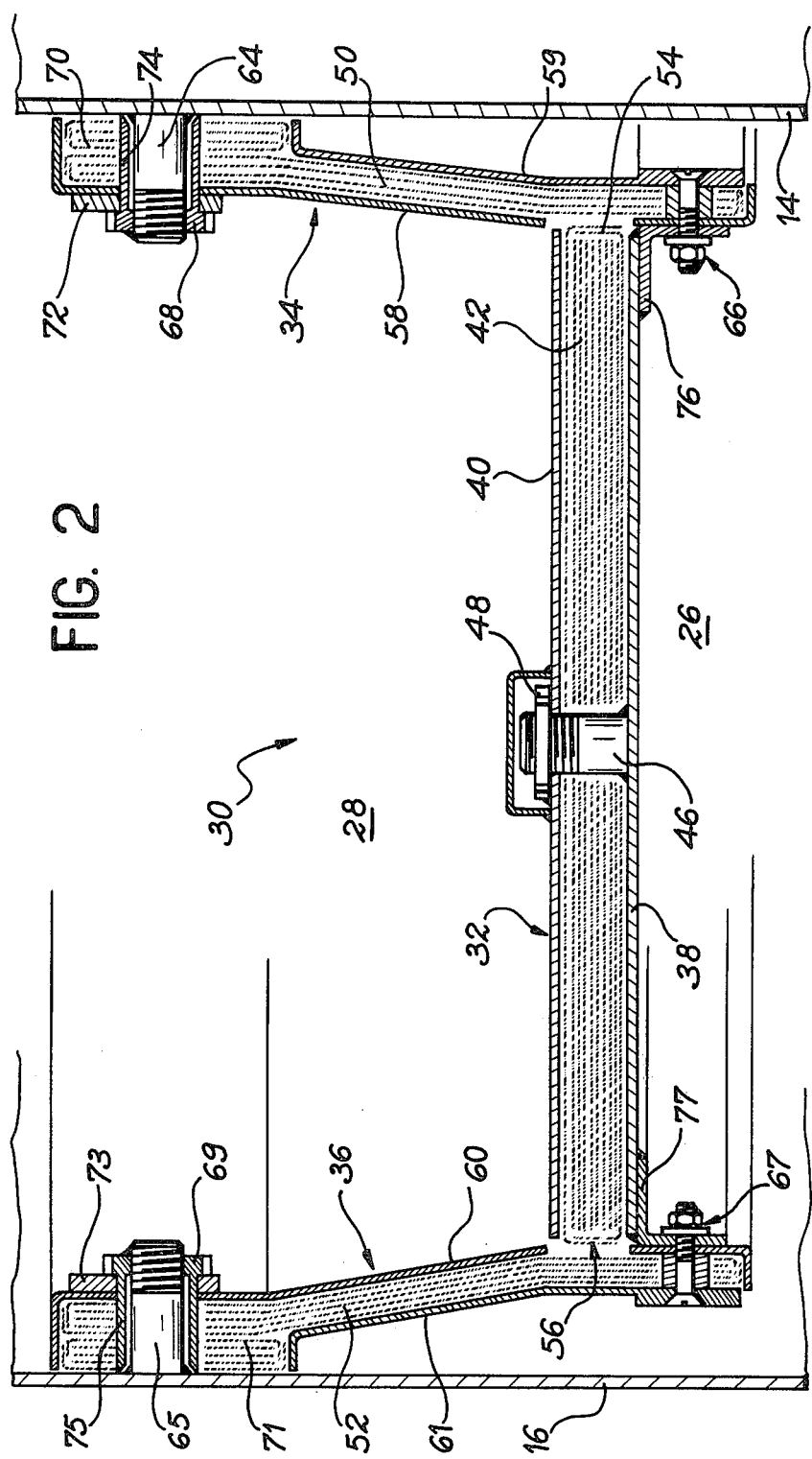
FIG. 2 a larger scale sectional view of an embodiment of the thermal insulation device according to the invention.

This thermal insulation device 30 is shown in sectional form along a plane passing through the common axis of the two vessels, whilst it is shown on a larger scale in FIG. 2.

FIG. 2 shows that this thermal insulation device essentially comprises three parts. Thus, device 30 firstly comprises a lower thermal insulation ring 32 having a generally annular shape and disposed horizontally in the annular space 26 defined between main vessel 14 and safety vessel 16. The thermal insulation ring 32 is positioned close to slab 12 and preferably above the liquid sodium level in the main vessel 14 in order that the sodium does not heat the nitrogen in part 28 of space 26. The thermal insulation ring 32 is suspended on vessels 14 and 16 by an inner thermal insulation baffle 34 and an outer thermal insulation baffle 36. According to the invention the assembly of these three components is realized in such a way that they ensure both a thermal insulation between the upper part 28 of annular space 26 and the remainder of said annular space, they make it possible to compensate the expansions and deformations which may occur in vessels 14 and 16 whilst still preserving the seal and also prevent any risk of said vessels puncturing.

It is visible in FIG. 2 that the diametral width of the thermal insulation ring 32 is much less than the width of the space 26 between vessels 14 and 16. In other words sufficiently large clearances are provided on the one hand between the inner edge 54 of ring 32 and main vessel 14 and on the other hand between the outer edge 56 of said ring and safety vessel 16 to take account of significant variations in the width of space 26. Moreover, with respect to ring 32 the thermal insulation baffles 34 and 36 behave in the manner of deformable supporting straps, whose flexibilty makes it possible for device 30 to withstand both the axial and transverse dimensional variations of the two vessels.

In order to perform their thermal insulation function ring 32 and baffles 34 and 36 are advantageously formed by means of a thermal insulation structure, whose construction can be in accordance with that for thermally protecting the base of the slab in a fast neutron reactor as described and claimed in French Patent Applicaton No. 73 23338 in the name of the Commissariat a l'Energie Atomique. It is pointed out that this structure comprises a stack of metal sheets forming successive superimposed panels separated from one another by thin sheets, said panels and said sheets constituting a layer of thin metal elements held between two thicker parallel end plates by assembly means such as pins or bolts. Moreover, the layer of thin metal members is preferably laterally bordered by angle members which fit into one another in order to define between them a narrow space making it possible to appropriately insulate the structure from the outside atmosphere surrounding it and more particularly from the inert gas contained in space 26.

Ring 32 then comprises a layer 42 of thin metal members held between a lower cover plate 38 and an upper cover plate 40, both of which are horizontal and modular, by pins 46 welded to lower cover plate 38 and whose upper end is threaded so as to receive a nut 48.

In a comparable manner each of the baffles 34, 36 comprises a layer 50, 52 of thin metal members held between two parallel cover plates 58, 59 and 60, 61 respectively, said plates being modular and have a generally cylindrical configuration, whose axis coincides with that of vessels 14 and 16. The assembly constituted by plates 58, 59 and layer 50 on the one hand and plates 60, 61 and layer 52 on the other is fixed together by means of pins 64, 65, which at the same time fix the baffles to vessels 14 and 16 and screws 66, 67, which at the same time fix the inner peripheral edge 54 and outer peripheral edge 56 of ring 32 to baffles 34, 36, as will be shown hereinafter. Other not shown assembly means such as pins or studs may be used to complete the assembly of baffles 34 and 36.

More specifically it is possible to see in FIG. 2 that the pins 64 are radially fixed by welding to the outer face of main vessel 14 and are provided at their other end with a thread on to which is screwed a nut 68. Pins 64 and nuts 68 associated therewith, thus ensure the decompression and fixing of the upper part of the inner thermal insulation baffle 34 to the outer face of the main vessel 14. Preferably an annular thermal insulation shim 70 is placed between baffle 34 and the outer face of the main vessel 14 in order to increase the deformation possibilities of baffle 34, whilst improving the thermal sealing, as will be shown hereinafter. The structure of the thermal insulation shim 70 is comparable to that of ring 32 and baffles 34, 36, in such a way that there is no need to described it in detail. A shim or ordinary washer 72 can also be placed between nut 68 and baffle 34. Finally nut 68 can be extended towards vessel 14 by a sleeve 74, whose length combined with the thickness of shim 72 makes it possible to limit the fastening of baffle 34 and shim 30.

The outer thermal insulation baffle 36 is fixed to safety vessel 16 by means of pins 65 in the same way as baffle 34 to the main vessel 14 and will not therefore be described in detail. It is merely pointed out that pins 65 are radially welded to the inner face of the safety vessel 16 and receive on their threaded end a nut 69 which simultaneously ensures the fastening of a shim or washer 73, the baffle 36 and an annular thermal insulation shim 71. The fastening and compression of baffle 36 and thermal insulation shim 71 can also be limited by means of shim 73 and sleeve 75 extending nut 69 towards vessel 16.

The inner peripheral edge 54 of the thermal insulation ring 32 is fixed to the lower end of the inner thermal insulation baffle 34 by means of bolts 66 using a supporting ring 76 constituted by modular elements and having a right angle-shaped cross-section, whereof one side is welded beneath the lower cover plate 38 of ring 32 and whereof the other side is fixed to the lower part of baffle 34 by bolts 66.

In the same way the outer peripheral edge 56 of thermal insulation ring 32 is fixed to the lower part of the outer thermal insulation baffle 36 by bolts 67 by means of the elements of a supporting ring 77 having a right angle-shaped cross-section and whereof one side is welded beneath the lower cover plate 38 of ring 32 and whereof the other side is fixed to the lower part of baffle 36 by means of bolts 67.

According to the represented embodiment of the invention the cover plates 58, 59, 60, 61 of each of the baffles 34 and 36 are given a relatively limited thickness. More specifically the thickness of cover plates 58, 59, 60, 61 is made such that the baffles 34 and 36 can deform in order to take account of possible deformations and expansions of vessels 14 and 16.

In a comparable manner the cover plates 38 and 40 of ring 32 are made relatively thin in order to permit a deformation thereof in the hypothesis of an excessive deformation of vessels 14 and 16 and would bring the latter into contact with the lower parts of the baffles 34 and 36. Thus, any risk of the vessels being punctured is eliminated.

In order to increase the possibility of deformation of baffles 34 and 36 FIG. 2 also shows that they have a slightly frustum shape in their central part. This shape is such that the lower part of the inner thermal insulation baffle 34 is normally further from main vessel 14 than its upper part. Moreover, even though the distance separating the upper part of baffle 34 from main vessel 14 is permanently fixed by the thickness of the thermal insulation shim 70, this does not apply to the distance separating the lower part of baffle 34 from vessel 14. Relatively large modifications to the latter distance by deformation of the central part of baffle 34 may occur as a result of expansions and deformations of vessels 14 and 16 during the operation of the reactor.

In a comparable manner the slight frustum shape of the central part of baffle 36 is such that the distance separating the latter from the safety vessel 16 is greater in its lower part than in its upper part. Moreover, as for baffle 34, even though the distance separating baffle 36 from vessel 16 is fixed by the thermal insulation shim 71 with respect to the upper part of the baffle, the distance separating the lower part of the baffle from vessel 16 can vary due to the deformation of the central part of the baffle 36, when required by the expansions and deformations of vessels 14 and 16.

It is apparent that the vessel described hereinbefore makes it possible to ensure a good thermal sealing between the hot inert gas and the cold inert gas located on either side thereof, whilst offering a very considerably flexibility with respect to extension and compression making it possible to support without damage expansions or possible deformations of the vessels. The seal between the different parts is obtained by tightening the fixing and assembly pins and bolts, which has the effect of bringing about the creep of the layer of thin metal members constituting the thermal insulation.

Figure 3:
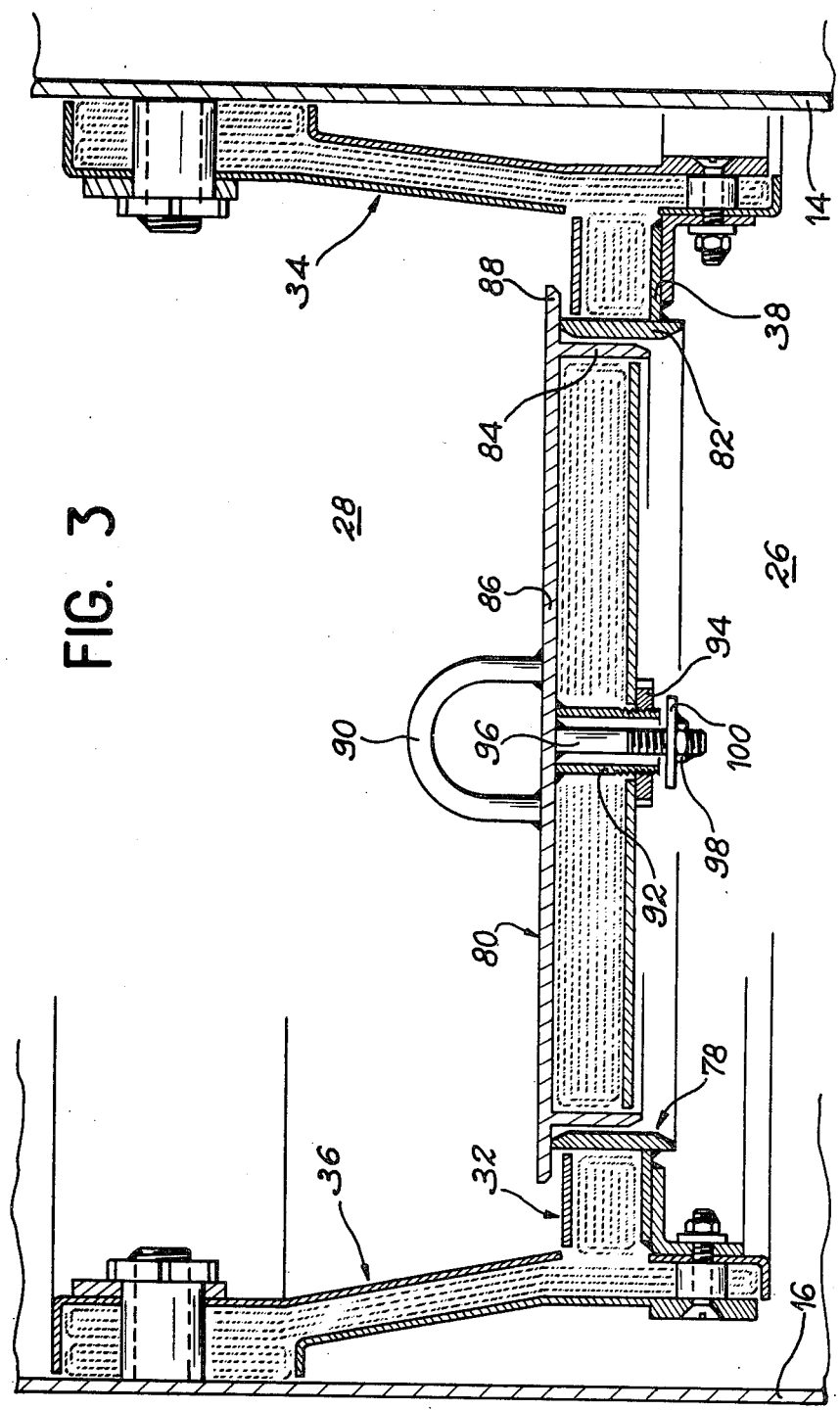
FIG. 3 a sectional view comparable to FIG. 2 showing part of the thermal insulation device containing an observation port sealed by a thermal insulation plug.

In order to permit access to the annular space 26 separating the main vessel 14 from the safety vessel 16 one or more observation ports 78 sealed by thermal insulation plugs 80 can be provided in the horizontal thermal insulation ring 32, as shown in FIG. 3.

The edge of port 78 is then materialized by a ferrule 82 welded, for example, to the lower cover plate 38 of ring 32. Plug 80 is preferably realized in a thermal insulation structure comparable to that of ring 32 and thermal insulation baffles 34, 36. It will not therefore be described in detail from this standpoint. It is merely pointed out that it comprises an upper cover plate 86 carrying a ferrule 84, which engages in ferrule 82. In addition, plate 86 has a border 88 which bears on the upper end of ferrule 82, so that the latter supports plug 80 by gravity. The upper plate 86 finally has in its central part a gripping system constituted by a lifting hook 90 welded to plate 86 in the represented variant. The fastening of the thermal insulation structure of plug 80 is brought about in conventional manner by one or more pins 92 welded to the upper cover plate 86 and whose lower threaded end receives a nut 94. In the variant shown in FIG. 3 pin 92 is hollow and within it there is a second pin 96, which is also welded to plate 86 and whose threaded end receives a second nut 98 maintaining a plate 100 slightly below the lower end of pin 92. This system constitutes a safety means making it possible to maintain the thermal insulation structure of plug 80 if the first pin 92 fractures.

What is claimed is:

1. A thermal insulation device for insulating the upper area of the annular space separating the main vessel and safety vessel of a fast neutron neuclear reactor, said two vessels having a common vertical axis and are sealed in their upper part by a horizontal slab which is also responsible for the suspension of the two vessels, wherein the said device comprises a lower thermal insulation ring having a generally annular shape defining an inner peripheral edge spaced from the main vessel and fixed to the lower end of an inner thermal insulation baffle whose upper end is fixed to the main vessel, and an outer peripheral edge spaced from the safety vessel and fixed to the lower end of an outer thermal insulation baffle whose upper end is fixed to the safety vessel, each of the thermal insulation baffles being deformable so as to compensate any differential expansion or deformation of the vessels.

2. A thermal insulation device according to claim 1, wherein each of the thermal insulation baffles is constituted by modular cover plates between which is arranged a layer of thin metal members compressed between the said cover plates by assembly means and wherein the cover plates are sufficiently thin to permit a deformation of the thermal insulation baffles making it possible to compensate any differential expansion or deformation of the vessels.

3. A thermal insulation device according to claim 2, wherein the lower thermal insulation ring is constituted by modular cover plates between which is provided a layer of thin metal members compressed between the cover plates by assembly means and wherein the cover plates are sufficiently thin to permit a deformation of the thermal insulation ring making it possible to prevent puncturing of the vessels in the case of excessive deformation thereof.

4. A thermal insulation device according to claim 3, wherein the peripheral edges of the thermal insulation ring are fixed to the lower end of the thermal insulation baffles by means of two supporting rings, each of the latter being constituted by modular elements having a right angle-shaped cross-section, whereof one side is welded beneath the lower cover plate of the thermal insulation ring and whereof the other side is fixed to the lower end of the corresponding thermal insulation baffle by the lower assembly means of said baffle.

5. A thermal insulation device according to claim 2, wherein the upper end of each of the baffles is fixed to the corresponding vessel by upper assembly means of said vessel.

6. A thermal insulation device according to claim 5, wherein the upper assembly means of each of the baffles comprise pins welded to the said vessels and on to which are screwed nuts.

7. A device according to claim 1, wherein the central part of each of the baffles is slightly frustum-shaped in such a way that the distance between each baffle and the vessel to which it is fixed is greater in its lower part than in its upper part.

8. A thermal insulation device according to claim 1, wherein annular thermal insulation shims are compressed between the upper part of each of the thermal insulation baffles and the vessel to which said baffle is fixed.

9. A thermal insulation device according to claim 1, wherein the lower thermal insulation ring is provided with observation ports normally sealed by thermal insulation plugs provided in their upper part with gripping means.

* * * * *